United States Patent
Maruyama et al.

[11] Patent Number: 6,084,707
[45] Date of Patent: *Jul. 4, 2000

[54] TRANSMISSION-TYPE SCREEN

[75] Inventors: Manabu Maruyama; Takashi Yamada, both of Miigata, Japan

[73] Assignee: Kuraray Co., Ltd., Kurashiki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,000

[22] Filed: Sep. 26, 1997

[30] Foreign Application Priority Data

Oct. 4, 1996 [JP] Japan ................... 8-264424

[51] Int. Cl.⁷ .................................. G03B 21/56
[52] U.S. Cl. .......................... 359/460; 359/450
[58] Field of Search .................. 359/449, 450, 359/460, 456, 457

[56] References Cited

U.S. PATENT DOCUMENTS

| | | | |
|---|---|---|---|
| 2,187,904 | 1/1940 | Hurley | 88/24 |
| 2,372,173 | 3/1945 | Bodde, Jr. | 88/28.93 |
| 3,614,768 | 10/1971 | Browning | 340/325 |
| 3,650,608 | 3/1972 | Baker | 350/320 |
| 3,655,203 | 4/1972 | Gretzky | 273/181 R |
| 4,323,301 | 4/1982 | Spector | 350/117 |
| 5,011,277 | 4/1991 | Ogino et al. | 353/94 |
| 5,085,495 | 2/1992 | Iwahara et al. | 359/455 |
| 5,200,854 | 4/1993 | Ogino et al. | 359/451 |
| 5,206,760 | 4/1993 | Nakashima et al. | 359/457 |
| 5,625,489 | 4/1997 | Glenn | 359/455 |
| 5,708,528 | 1/1998 | Furuya | 359/457 |
| 5,818,639 | 10/1998 | Furuya | 359/455 |

*Primary Examiner*—Safet Metjahic
*Assistant Examiner*—Christopher E. Mahoney
*Attorney, Agent, or Firm*—Oblon, Spivak, McClelland, Maier & Neustadt, P.C.

[57] ABSTRACT

There is disclosed a large-sized transmission-type screen used for a multi-image system. If the screen expands or contracts due to variations of the ambient temperature or humidity, generation of creases or relieves is prevented. The transmission-type screen includes image sources for projecting and magnifying optical images, screen members for transmitting the projected optical images, first light-blocking members mounted to edges of the screen members, and a support member having tensioning mechanisms. Each tensioning mechanism applies a tension to the first light-blocking members to hold the components of the screen members in intimate contact with the support member. Each screen member includes a lenticular lens sheet, a composite Fresnel sheet consisting of sheet members bonded vertically, and plural transparent reinforcing sheets. Each reinforcing sheet is substantially identical in size with each sheet member of the composite Fresnel sheet. A second light-blocking member is bonded between the two adjacent transparent reinforcing sheets to prevent the optical images from the adjacent image sources from overlapping.

10 Claims, 4 Drawing Sheets ically 1
TRANSMISSION-TYPE SCREEN

FIELD OF THE INVENTION

The present invention relates to a transmission-type screen.

BACKGROUND OF THE INVENTION

In recent years, large-sized rear-projection display systems have been used for broadcasting or plant control systems, because large-sized screens more than 70 inches can be relatively easily accomplished. However, at the rear-projection display system using a screen more than 100 inches, the projection distance between the screen and the projector is too long and the depth of the rear-projection display system is too large. Further the brightness of the screen is too low. For these reason, a multi-image system comprising small-sized rear-projection display systems arranged in rows and columns to create one large image has been proposed and put into practical use (Japanese Unexamined Publication Nos. 273649/1993, 102582/1994 and 234998/1994). In particular, lenticular lens sheets and Fresnel lens sheets are bonded together to form a large-sized screen. Light-blocking members are mounted on the incident surface of the screen to prevent images coming from the projectors from overlapping. However, where the ambient temperature or humidity varies, the screen expands or shrinks. This produces creases or relieves, thus deteriorating the resolution or color uniformity. Furthermore, where the environmental conditions vary as described above, the bonded portions of the Fresnel lens sheets and the light-blocking members are misaligned. In this case, images or shadows of the light-blocking members are superimposed on the final large-sized image.

On the other hand, Japanese Patent Unexamined Publication No. 73938/1991 discloses a multi-image system having screen members held in intimate contact with each other and connected together by the use of wires and springs. This technique reduces the effects of changes in the ambient temperature or humidity. This technique is very excellent as a method of holding the screen members in intimate contact with each other. However, if the screen members are viewed at a distance of 2 or 3 m, these holes and wires can be observed. Furthermore, if the dimensions of the lenticular lens sheets and Fresnel lens sheets are varied due to variations in the ambient temperature or humidity, and if a Fresnel lens sheet becomes wider than a lenticular lens sheet, then light leaks through the junctions of the screen members. Consequently, the widths of these lens sheets must satisfy strict dimensional accuracy.

SUMMARY OF THE INVENTION

The present invention has been made to solve the foregoing problems.

It is an object of the present invention to provide a large-sized rear-projection screen which is used for a multi-image system or the like and prevents creases or relieves that tend to be produced by expansion or contraction of this large-size screen due to changes in the ambient temperature or humidity, the rear-projection screen being further characterized in that blank portions appearing at the junctions of individual screen members are inconspicuous.

This object is achieved in accordance with the teachings of the invention by a rear-projection screen comprising image sources for projecting and magnifying optical images, individual screen members for transmitting the projected optical images, first light-blocking members mounted to edges of the screen members, and support members having tensioning mechanisms. The tensioning mechanisms give a tension to the first light-blocking members to hold the screen members in intimate contact with each other. The first light-blocking members are bonded to at least two opposite sides of each screen member with an adhesion resin or by other method.

A tension is applied to the first light-blocking members mounted to the right and left edges of each screen member. The screen members are held in intimate contact with each other and secured. Therefore, if the screen members are expanded or contracted due to variations in the ambient temperature or humidity, generation of creases or relieves on the screen members can be prevented.

The above-described screen members in accordance with the present invention are each made of a lenticular lens sheet and a Fresnel lens sheet. The lenticular lens sheet is placed on the observer's side. The Fresnel lens sheet is positioned on the image source side. The first light-blocking members can be mounted to edges of the lenticular lens sheet. This lenticular lens sheet is elongated vertically and consists of one vertically elongated sheet or plural sheets bonded in the vertical direction. The Fresnel lens sheet can be formed by bonding together plural sheets in the vertical direction, each sheet having coaxial lenses at least on its one surface. A Fresnel lens sheet obtained by bonding plural sheet members in the vertical direction is hereinafter referred to as a composite Fresnel lens sheet. The use of the vertically elongated lenticular lens sheet and the Fresnel lens sheet as described above facilitates carrying the screen assembly into a desired location. Also, any screen support member extending across the final large-sized image can be dispensed with. Moreover, gap across the screen can be eliminated.

Where the Fresnel lens sheet consisting of plural sheet members bonded in the vertical direction is used, transparent reinforcing sheets having second light-blocking members may be added to the screen members. Each transparent reinforcing member is substantially equal in size to each sheet member forming the Fresnel lens sheet. Each second light-blocking member bonded between the two adjacent transparent reinforcing sheets prevents optical images from adjacent image sources from overlapping. The transparent reinforcing sheets may be placed closer to the image sources than the Fresnel lens sheet.

In another embodiment of the invention, the Fresnel lens sheet and the transparent reinforcing sheets having the second light-blocking members are warped into an bow-shaped form so that they have convex contacting surfaces. Preferably, the radius of curvature of the Fresnel lens sheet is set larger than that of the transparent reinforcing sheets having the second light-blocking members. This enhances the adhesion between both kinds of members.

The junction of each screen member and each end of the first light-blocking members is made impenetrable to light. Where the transmission-type screen in accordance with the present invention is used in a multi-image system or the like, leakage from the junctions of the adjacent screen members can be prevented. Where each first light-blocking member is provided with slits crossing the screen members substantially perpendicularly so that the first light-blocking members can expand and contract longitudinally of the screen members, generation of creases or relieves due to variations in the ambient temperature or humidity can be suppressed further. Where each first light-blocking member is made of plastic film having a thickness of 0.1 to 1.0 mm, the generation of creases or relieves due to elongation or contraction of the screen members can be suppressed further. As a result, the blank portions can be narrowed further.

Preferably, each tensioning mechanism for applying a tension to the first light-blocking member is constructed, using a spring. A mechanism for finely adjusting the tension applied by the spring is added to the tensioning mechanism. In this structure, if the machining accuracy is not so high that obtained dimensions are not uniform, the tensions of the springs can be finely adjusted so that a uniform tension is applied to the whole screen assembly. This is effective in preventing creases or relieves.

Other objects and features of the invention will appear in the course of the description thereof, which follows.

DETAILED DESCRIPTION OF THE INVENTION

Figure 1:
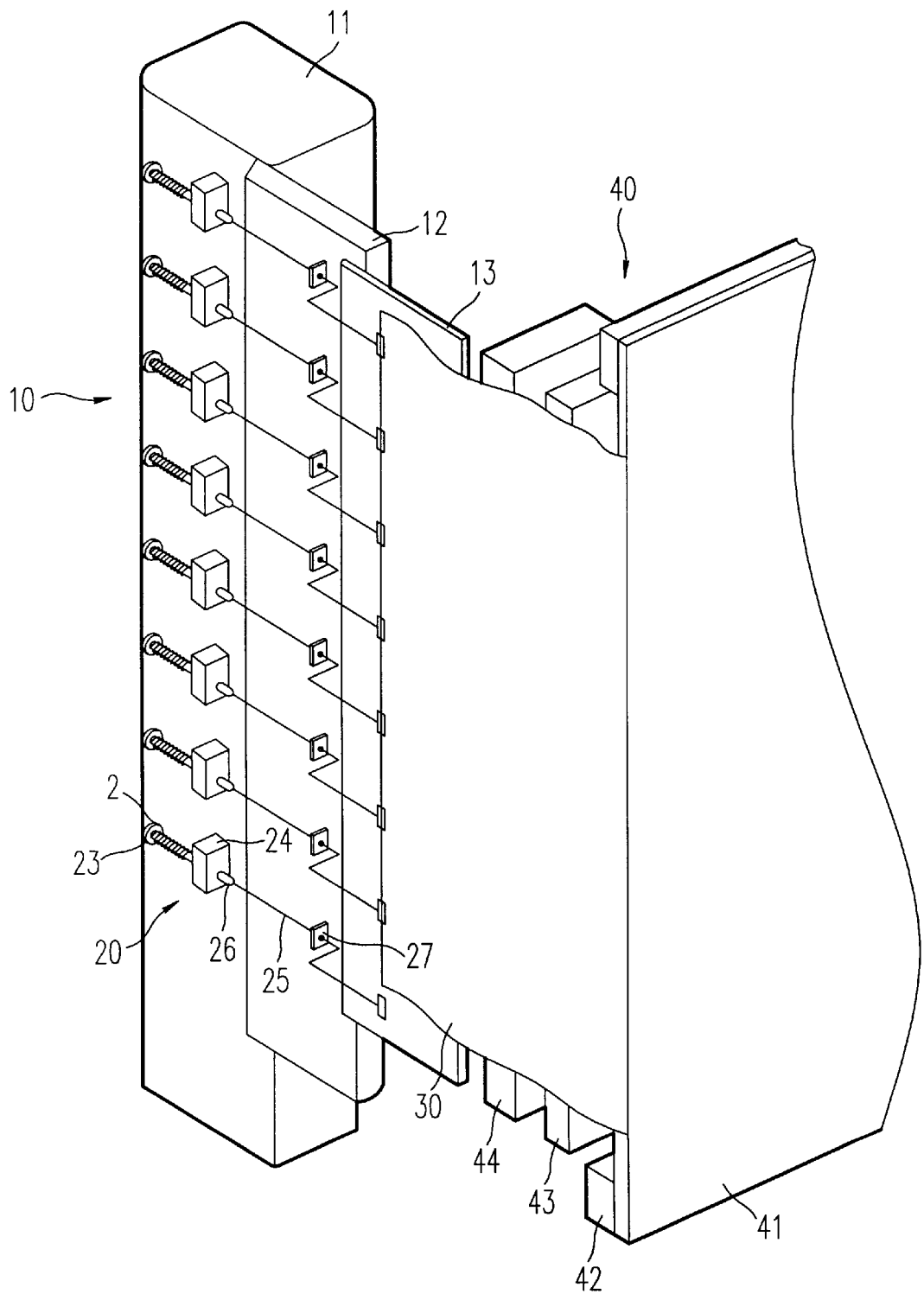
FIG. 1 is a fragmentary enlarged perspective view of a transmission-type rear-projection screen in accordance with the present invention.

FIG. 1 is a fragmentary enlarged view of a transmission-type rear-projection screen in accordance with the present invention. This screen has a support member, generally indicated by reference numeral 10. This support member 10 comprises a tubular support member 11 (e.g., a rectangular member having a thickness of 30 mm and a width of 60 mm), a vertical holder plate 12 (e.g., a flat plate having a thickness of 5 mm and a width of 60 mm), and a light-blocking side member 13 (e.g., a flat plate having a thickness of 1.6 mm and a width of 70 mm). The support member 11 is made of a metal or plastic painted delustered black with baking finish. The support member 11 is equipped with tensioning mechanisms 20 for holding screen members in intimate contact with each other. Cushion members (not shown) (e.g., a both-sided tape having a thickness of 2 mm) are mounted between the support member 11 and the holder plate 12 to protect the screen members and to keep out dust. Tape is stuck on the cushion members to reduce the friction that the screen members experience and to permit the screen members to expand and contract.

Figure 2:
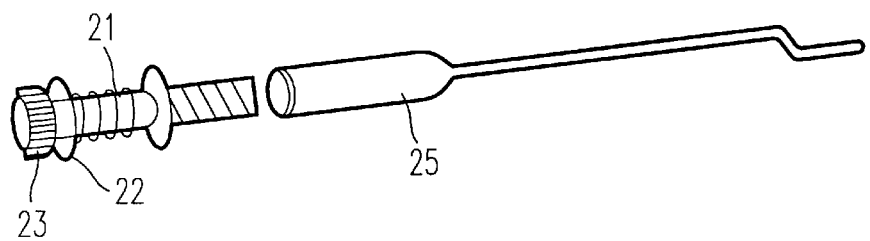
FIG. 2 is a perspective view of one tensioning mechanism used in the transmission-type rear-projection screen shown in FIG. 1.

The tensioning mechanisms 210 accommodate expansion and contraction of the screen members caused by variations in the ambient temperature or humidity. These tensioning mechanisms 20 retain the screen members in intimate contact with the support member 10 to prevent creases or relieves. As shown in FIG. 2, each tensioning mechanism 20 has coil springs 21 and washers 22 mounted around their respective bolts 23. These bolts 23 are inserted in holes 24 formed in the support member 11. The bolts 23 are connected to joints 26 of bent rods 25, which in turn pass through their respective guide holes 27 formed in the holder plate 12. First light-blocking members 30 are mounted to end surfaces of a lenticular lens sheet 41. The bent rods 25 are connected to the first light-blocking members 30. The tension in each first light-blocking member 30 can be finely adjusted by varying the amount of screwing of the bolt 23 into the joint 26 of the bent rod 25 so as to change the repulsive force of each coil spring 21 mounted to the support member 11.

Figure 3:
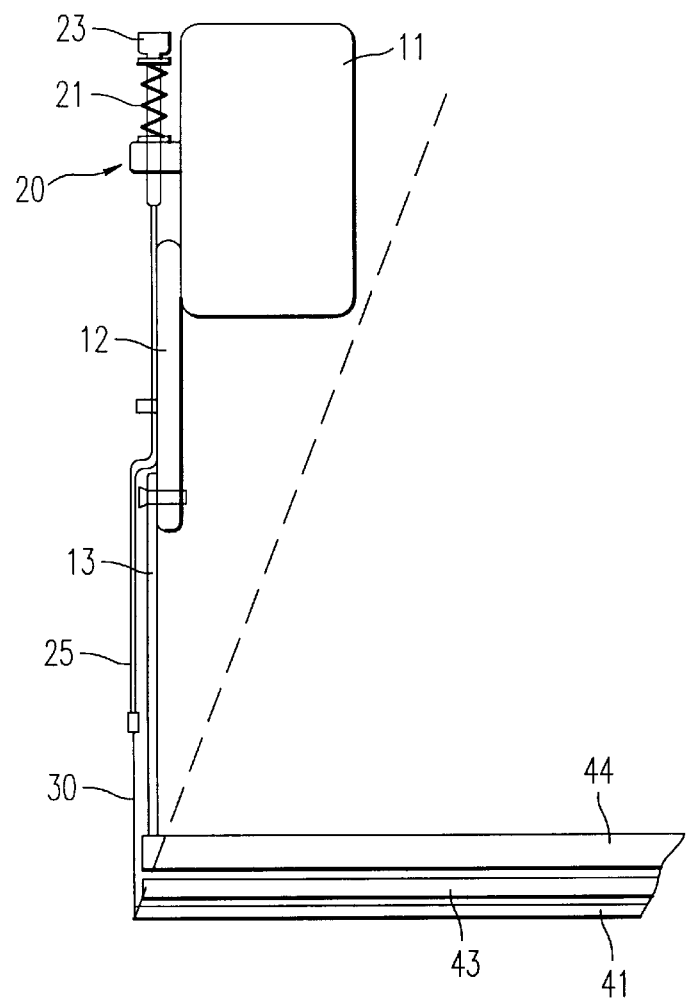
FIG. 3 is a fragmentary plan view of a support member, a tensioning mechanism, and a screen member used in the transmission-type rear-projection screen shown in FIG. 1.

The support member 10 and one tensioning mechanism 20 are shown in the plan view of FIG. 3. The support member 11 of the support member 10 and the tensioning mechanism 20 are located outside the ranges of optical images (whose extension is indicated by the broken line in the figure) to prevent the optical images projected onto screen members from image sources (not shown) from being obstructed. Each of these screen members is composed of the lenticular lens sheet 41, the composite Fresnel lens sheet 43, and vertically elongated, transparent reinforcing sheets 44 having a second light-blocking member (described later).

The aforementioned screen members, generally indicated by 40, are next described. Each screen member 40 comprises the lenticular lens sheet 41, the composite Fresnel lens sheet 43, and the vertically elongated, transparent reinforcing sheets 44 having the second light-blocking member. The lenticular lens sheet 41 is, for example, made of an extruded sheet of polymethylmethacrylate having a width of 1220 mm and a length of 1960 mm (60", two-stage size). Reinforcing members 42 of acrylic resin, each having a width of 25 mm, a length of 1250 mm, and a thickness of 8 mm, are adhesively bonded to the top and bottom sides, respectively, of the lenticular lens sheet 41. The upper reinforcing member bonded to the top side of the lenticular lens sheet 41 is mounted to a flat bar (not shown) and depends from this bar, which in turn is mounted to the support member 11. The composite Fresnel Lens sheet (described later in further detail) and the transparent reinforcing sheet are carried on the lower reinforcing member bonded to the bottom side. The weight of the composite Fresnel lens sheet and transparent reinforcing sheets exerts a tension downwardly of the lenticular lens sheet 41.

The first light-blocking members 30 mounted to the right and left sides, respectively, of the lenticular lens sheet 41 are each made of a piece of cloth having a thickness of 0.1 to 1 mm, a plastic film (e.g., made of polycarbonate or cellulose), or the like. Each first light-blocking member can be made of a black cloth or film. Besides, the first light-blocking member can be obtained by painting black the portion of a transparent film bonded to the lenticular lens sheet, painting the whole film black, or attaching a black tape to the film. These first light-blocking members are bonded to edges of the screen members with a chlorine-based adhesion resin such as methylene chloride or chloroform. Where the thickness of each first light-blocking member lies in the range of from 0.1 to 1.0 mm, a tension sufficient to hold the screen members in intimate contact with the support member can be applied. Furthermore, the width of the blank portions at the junctions of the screen members can be reduced.

Figure 6A:
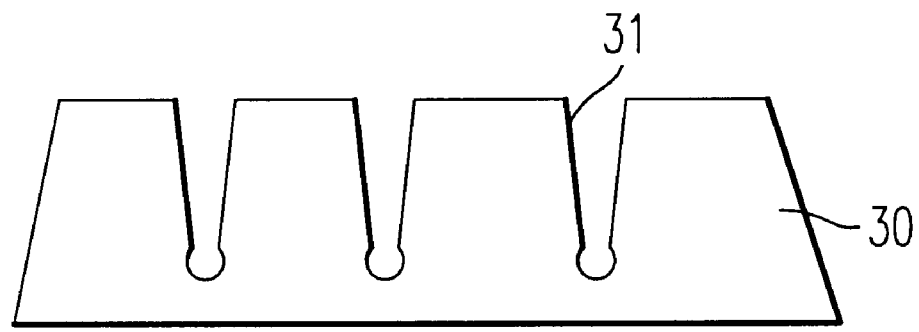
FIGS. 6(a) and 6(b) are fragmentary plan views of examples of the first light-blocking member shown in FIG. 5.
Figure 6B:
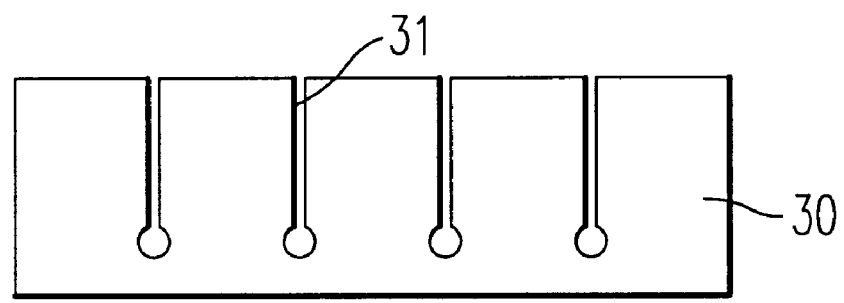

FIGS. 6(a) and 6(b) are fragmentary plan views of examples of the first light-blocking members. In these examples, the first light-blocking member 30 is provided with slits 31 spaced 100 mm, for example, from each other. These slits 31 extend substantially perpendicularly to the screen member and permit it to expand and contract in its longitudinal direction. This can further suppress generation of creases or relieves on the screen member. Where the front end of each slit is shaped into an bow-shaped form having a radius of about 2 mm as shown, the first light-blocking member can be prevented from breaking or cracking from the positions of the slits.

Where the transmission-type rear-projection screen in accordance with the present invention is used for a multi-image system comprising a stack of box-shaped projectors, the first light-blocking members can be mounted to the top and bottom sides of the lenticular lens sheet (screen members), as well as to the right and left sides. Each first light-blocking member can assume the form of a sheet or a flat plate.

The composite Fresnel lens sheet 43 comprises two Fresnel lens sheets made of acrylic resin, styrene resin, or polycarbonate resin. These two resinous sheets are bonded together vertically with an adhesive such that the resulting sheet is elongated vertically. For example, each resinous sheet has a thickness of 3 mm, an outer width of 1220 mm, and a height of 950 mm. A colorant may be added to the adhesive. Preferably, this composite Fresnel lens sheet is set in a given mold so that the incident surface assumes a convex form. Then, the composite sheet is placed at a temperature of about 80° C., for example, to warp the composite sheet. It is desired that the radius of curvature of the composite Fresnel lens sheet be approximately 15 to 20 m.

The vertically elongated transparent reinforcing sheets 44 having the second light-blocking members are mounted on the image source sides of the screen members 30. Each reinforcing sheet 44 comprises two transparent reinforcing plates made of acrylic resin or styrene resin and the second light-blocking member 45 (FIG. 4) made of acrylic resin or styrene resin. Each of the two reinforcing plates has a thickness of 5 mm, an outer width of 1250 mm, and a height of 950 mm. The second light-blocking member 45 has a thickness of 1 mm and a height of 35 mm. This second light-blocking member 45 (FIG. 4) is bonded between the two transparent reinforcing plates and bonded to them with an adhesive. The portions of the end surfaces of the transparent reinforcing plates to which the second light-blocking member should be mounted are cut into a groove having a depth of 2.5 mm and a width of 0.5 mm with a router and machined into a stair-like form. These stair-like cross sections are made to abut against each other to form a U-shaped groove. The second light-blocking member 45 is stuck into this U-shaped groove and bonded to the reinforcing plates, thus completing a transparent reinforcing sheet having a thickness of 5 mm. The second light-blocking member can take the form of a sheet or flat plate.

The end surfaces against which the two transparent reinforcing plates bear can be painted black or applied with a black tape or adhesive to render these end surfaces impenetrable to light. Where the above-described dimensions are adopted, ineffective portions not transmitting light are created in the bonded portions of the composite Fresnel lens sheet 43. The ineffective portions have a width of about ±0.5 mm at the illuminated positions and a width of about ±1 mm at locations spaced 2.5 mm from the illuminated positions. As described above, the cross section of each portion of the vertically elongated transparent reinforcing sheet 44 bonded to the second light-blocking member is machined into a stair-like form. The second light-blocking member is mounted in the groove formed by causing the cross sections to abut against each other. The abutting portions are painted black. Therefore, if the second light-blocking member and each bonded portion of the composite Fresnel lens sheet are slightly misaligned due to variations of the ambient temperature or humidity due to poor machining accuracy, the shadow of the second light-blocking member 45 can be confined within the ineffective portions of the composite sheet.

The transparent reinforcing sheet 44 is preferably set in a given mold such that the exit surface becomes convex. Then, the sheet is placed at a temperature of about 80° C. to warp the sheet. Preferably, the radius of curvature of the vertically elongated transparent reinforcing sheet having the second light-blocking sheet is set to approximately 10 to 15 m so that the radius of curvature of the composite Fresnel lens sheet is less than that of the transparent reinforcing sheet. This assures that both sheets are bonded together firmly.

Figure 4:
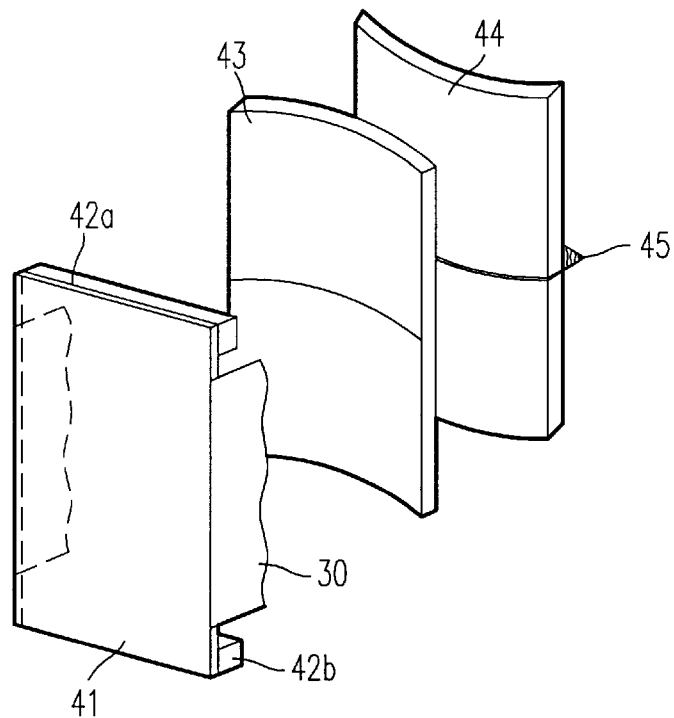
FIG. 4 is a perspective view illustrating the manner in which the transmission-type rear-projection screen shown in FIG. 1 is mounted.
Figure 5:
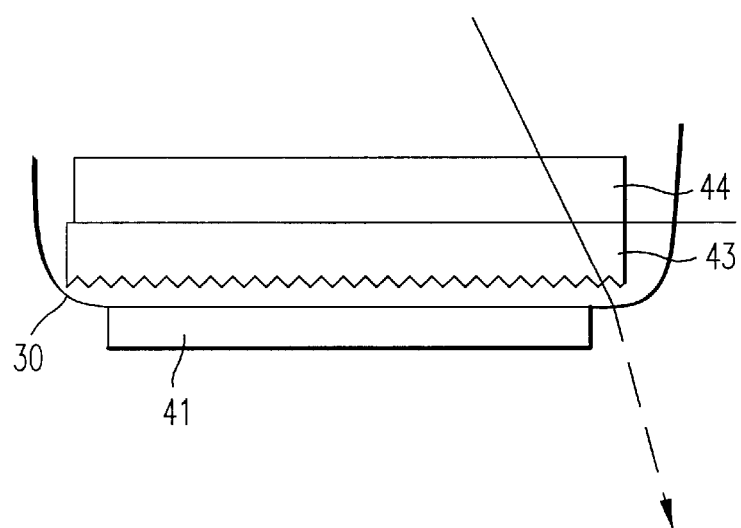
FIG. 5 is a plan view of one first light-blocking member used in the transmission-type rear-projection screen shown in FIG. 1, illustrating the function of the light-blocking member.

The manner in which the screen members 40 are mounted to the support member 10 is next described by referring to FIG. 4. The upper reinforcing member, 42a, of the lenticular lens sheet 41 is mounted to a laterally extending flat bar (not shown), which in turn is mounted to the support member 11. The lens sheet 41 depends from this flat bar. The composite Fresnel lens sheet 43 and the transparent reinforcing sheet 44 having the second light-blocking member are carried on the lower reinforcing member, 42b, such that the surfaces of the sheets 43 and 44 bonded together are convex. The first light-blocking members 30 mounted to the right and left sides of the lenticular lens sheet 41 are connected to the portions of the bent rods 25 to which the sheet members are mounted. Therefore, the screen members are totally held in intimate contact with each other. The weight of the composite Fresnel lens sheet and the transparent reinforcing sheets exerts a downward tension. As a result of the mounting described thus far, even if the screen members expand or contract due to variations of the ambient temperature or humidity, the screen members are prevented from producing creases or relieves. Where temperature variations or poor cutting machining accuracy makes the composite Fresnel lens sheet 43 wider than the lenticular lens sheet 41 as shown in FIG. 5, the first light-blocking members 30 can prevent leakage of light through the junctions of the screen members. If the composite Fresnel lens sheet 43 and the vertically elongated reinforcing sheet 44 having the second light-blocking member are made of materials of almost identical properties, both kinds of sheets expand or contract almost identical amounts. Also, if these sheets 44 and 43 are made identical in size, it is unlikely that the position where the composite Fresnel lens sheet is bonded and the second light-blocking member are misaligned. Consequently, superimposition of shadows of the light-blocking members on the final large-sized image can be prevented.

While the description of the transmission-type rear-projection screen in accordance with the present invention has chiefly centered on those used in multi-image systems, the application of the transmission-type rear-projection screen in accordance with the invention is not limited to the usage in multi-image systems.

The present invention prevents creases or relieves which would be easily produced when a large-sized transmission-type screen used in a multi-image system or the like expands or contracts due to variations of the ambient temperature or humidity. The blank portions at the junctions of the screen members can be made inconspicuous.

What is claimed is:

1. A transmission-type rear-projection screen comprising:

image sources configured to project and magnify optical images;

screen members having an operative part receiving and transmitting said magnified optical images for viewing from a side of the screen members furthest from the image sources;

first light-blocking members mounted to edges of said screen members at screen edge locations away from said operative part so as not to obstruct image passage at said operative part while being of continuous light blocking extent to prevent light from passing through said light blocking members at said screen edge locations away from said operative part; and support members having adjustable tensioning mechanisms configured to apply an adjustable tension to said first light-blocking members to compensate for temperature and humidity changes to prevent creases or relieves of said screen members, wherein said support members and said adjustable tensioning mechanisms are located away from said operative part.

2. The transmission-type screen of claim 1, wherein said first light-blocking members are bonded to at least two opposite edges of each of said screen members.

3. The transmission-type screen of claim 1, wherein each of said screen members includes a lenticular lens sheet and a Fresnel lens sheet, said lenticular lens sheet being located closer to the side of the screen members furthest from said image sources with said Fresnel lens sheet being located on a side closer to said image sources, and wherein said first light-blocking members are mounted to edges of said lenticular lens sheet.

4. The transmission-type screen of claim 3, wherein said lenticular lens sheet is vertically elongated and comprises one sheet or plural sheets bonded together vertically.

5. The transmission-type screen of claim 3, wherein said Fresnel lens sheet comprises plural sheet members bonded together vertically.

6. The transmission-type screen of claim 5, wherein each of said screen members comprises the lenticular lens sheet, the Fresnel lens sheet comprised of plural sheet members bonded together vertically, and plural transparent reinforcing sheets each almost identical in size with each of said sheet members, second light-blocking members are bonded between the adjacent transparent reinforcing sheets to prevent the optical images from the adjacent image sources from overlapping, and said transparent reinforcing sheets having the second light-blocking members are positioned closer to said image sources than said Fresnel lens sheet.

7. The transmission-type screen of claim 6, wherein said Fresnel lens sheet and said transparent reinforcing sheets having the second light-blocking members are each shaped into a bow-shaped form such that they have convex contacting surfaces, and wherein said Fresnel lens sheet has a radius of curvature greater than that of said transparent reinforcing sheets having the second light-blocking members.

8. The transmission-type screen of claim 1, wherein each of said first light-blocking members has portions mounted to edges of said screen members, and wherein said portions are impenetrable to light.

9. The transmission-type screen of claim 1, wherein each of said first light-blocking members is provided with slits extending substantially perpendicularly to said screen members to permit said first light-blocking members to expand and contract longitudinally of said screen members.

10. The transmission-type screen of claim 1, wherein each of said adjustable mechanisms for applying a tension to said first light-blocking members is constructed, using a spring, and wherein said adjustable mechanism has a function of finely adjusting the tension of the spring.

* * * * *